(12) United States Patent
Gaal et al.

(10) Patent No.: US 7,085,574 B2
(45) Date of Patent: Aug. 1, 2006

(54) GRANT CHANNEL ASSIGNMENT

(75) Inventors: Peter Gaal, San Diego, CA (US); Boris S. Tsybakov, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 259 days.

(21) Appl. No.: 10/633,013

(22) Filed: Aug. 1, 2003

(65) Prior Publication Data

US 2004/0209620 A1    Oct. 21, 2004

Related U.S. Application Data

(60) Provisional application No. 60/463,414, filed on Apr. 15, 2003.

(51) Int. Cl.
*H04Q 7/20* (2006.01)
(52) U.S. Cl. .................. 455/452.1; 455/450; 455/561; 370/445; 370/431
(58) Field of Classification Search ............ 455/452.1, 455/450, 562.1; 370/445, 431
See application file for complete search history.

(56) References Cited

U.S. PATENT DOCUMENTS

| | | | | |
|---|---|---|---|---|
| 6,810,026 | B1 * | 10/2004 | Huttunen | ................. 370/310 |
| 2001/0030949 | A1 * | 10/2001 | Molno et al. | ............... 370/329 |
| 2002/0012332 | A1 * | 1/2002 | Tiedemann et al. | ......... 370/335 |
| 2003/0137988 | A1 * | 7/2003 | Enns | ........................ 370/455 |
| 2004/0213264 | A1 * | 10/2004 | Mistry et al. | ............ 370/395.7 |
| 2004/0223455 | A1 * | 11/2004 | Fong et al. | ................. 370/229 |
| 2005/0013322 | A1 * | 1/2005 | Yamagishi | .................. 370/468 |

FOREIGN PATENT DOCUMENTS

| | | |
|---|---|---|
| EP | 0760564 | 3/1997 |
| WO | 0172080 | 9/2001 |
| WO | 0217668 | 2/2002 |

OTHER PUBLICATIONS

Mouly, M., et al. "Radio Resource Management" *GSM System for Mobile Communications*, Lassay-Les Chateaux, Eirope Media, FR, 1993, pp. 308-430, XP000860006, p. 375.

* cited by examiner

*Primary Examiner*—Danh Cong Le
(74) *Attorney, Agent, or Firm*—Philip R. Wadsworth; Thien T. Nguyen; S. Hossain Beladi

(57) ABSTRACT

Methods and apparatus for scheduling grant channels to carry grant messages to a plurality of scheduled mobile stations. The scheduling of grant channels involves dynamically assigning to a current mobile station of the plurality of scheduled mobile stations, a previously unassigned grant channel from a list of grant channels monitored by the current mobile station. If there are more mobile stations to be processed in the plurality of scheduled mobile stations, then the scheduling moves to a next mobile station in the plurality of scheduled mobile stations, and the assignment process is repeated. Furthermore, if not every grant channel has been assigned a mobile station, then the order of the plurality of scheduled mobile stations is rearranged, and the assignment and the movement processes are repeated.

14 Claims, 8 Drawing Sheets

| | GCHs for MS to monitor | | |
|---|---|---|---|
| MS1 | 1 | 2 | 3 |
| MS2 | 4 | 5 | 6 |
| MS3 | 1 | 7 | 8 |
| MS4 | 2 | 3 | 4 |
| MS5 | 5 | 6 | 7 |
| MS6 | 1 | 2 | 8 |
| MS7 | 3 | 4 | 5 |
| MS8 | 6 | 7 | 8 |
| MS9 | 1 | 2 | 3 |
| MS10 | 4 | 5 | 6 |

FIG. 2A

| | MSs scheduled and rotated | | | | | | | |
|---|---|---|---|---|---|---|---|---|
| R0 | 2 | 3 | 4 | 6 | 7 | 8 | 9 | 10 |
| R1 | 3 | 4 | 6 | 7 | 8 | 9 | 10 | 2 |
| R2 | 4 | 6 | 7 | 8 | 9 | 10 | 2 | 3 |
| R3 | 6 | 7 | 8 | 9 | 10 | 2 | 3 | 4 |
| R4 | 7 | 8 | 9 | 10 | 2 | 3 | 4 | 6 |
| R5 | 8 | 9 | 10 | 2 | 3 | 4 | 6 | 7 |
| R6 | 9 | 10 | 2 | 3 | 4 | 6 | 7 | 8 |
| R7 | 10 | 2 | 3 | 4 | 6 | 7 | 8 | 9 |

FIG. 2B

| | Assignment of scheduled MSs | | | | |
|---|---|---|---|---|---|
| | R0 | R1 | R2 | R3 | R4 |
| GCH1 | 3 | 3 | 6 | 6 | 9 |
| GCH2 | 4 | 4 | 4 | 9 | 4 |
| GCH3 | 7 | 7 | 7 | 7 | 7 |
| GCH4 | 2 | 10 | 10 | 10 | 10 |
| GCH5 | 10 | 2 | 2 | 2 | 2 |
| GCH6 | 8 | 8 | 8 | 8 | 8 |
| GCH7 | - | - | 3 | 3 | 3 |
| GCH8 | 6 | 6 | - | - | 6 |
| OUTAGE | 9 | 9 | 9 | 4 | - |

FIG. 2C

GRANT CHANNEL ASSIGNMENT

CLAIM OF PRIORITY UNDER 35 U.S.C. §119

The present Application for Patent claims priority to Provisional Application No. 60/463,414 entitled "Grant Channel Assignment" filed Apr. 15, 2003, and assigned to the assignee hereof and hereby expressly incorporated by reference herein.

BACKGROUND

1. Field

The disclosed embodiments relate generally to telecommunication networks, and more specifically to assigning grant channels to mobile stations in such networks.

2. Background

A High Data Rate (HDR) subscriber station or mobile station (MS), referred to herein as an access terminal, may be mobile or stationary, and may communicate with one or more HDR base stations (BS), referred to herein as modem pool transceivers. An access terminal transmits and receives data packets through one or more modem pool transceivers to an HDR base station controller, referred to herein as a modem pool controller. Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

In various system configurations of the HDR access network, the base station (BS) may use individual Grant Channels (GCH) to issue mobile station (MS)-specific grants, such as Reverse Enhanced Supplemental Channel (R-ESCH) grants. According to these system configurations, an individual GCH may carry information for a single MS only. Thus, if more than one MS needs to be scheduled simultaneously in a particular time slot, then more than one GCH must be used. The number of grant channels used is determined by the number of mobile stations that can be simultaneously scheduled in the same time slot, and also by the existence of a common grant channel.

Accordingly, to ensure mobile stations are notified about the grants, each mobile station can monitor every individual one of the grant channels. In that case, as long as the number of mobile stations scheduled in a time slot does not exceed the number of grant channels, each scheduled mobile station can be notified about the grant. This monitoring of every individual grant channel, however, requires each mobile station to monitor a relatively large number of parallel code channels, and increases the complexity of the mobile station processing. To reduce the required processing in the mobile stations, a subset of the grant channels can be assigned to each mobile station for monitoring. However, requiring the mobile station to monitor only a subset of the grant channels means that there may be times when not every scheduled mobile station can be notified about the grant. This expected performance loss, comprising the failure of GCH notification, is referred to herein as a "GCH outage" and is due to conflicts between the assigned subsets.

It should be apparent from the discussion above that there is a need for efficient notification of grant channels to each mobile station such that each mobile station monitors less than all available individual grant channels. The present invention satisfies this need.

SUMMARY

Embodiments disclosed herein efficiently assign grant channels to mobile stations such that each mobile station monitors less than all available individual grant channels. The assignment of grant channels to mobile stations includes selection of a grant channel to carry the notification to each scheduled mobile station.

In one aspect, grant channels are scheduled to carry grant messages to a plurality of scheduled mobile stations. In particular, the scheduling of grant channels involves dynamically assigning, to a current mobile station of the plurality of scheduled mobile stations, a previously unassigned grant channel from a list of grant channels monitored by the current mobile station. After scheduling the current mobile station, if there are more mobile stations to be processed in the plurality of scheduled mobile stations, then the scheduling moves to a next mobile station in the plurality of scheduled mobile stations, and the assignment process is repeated. Furthermore, if not every grant channel has been assigned to a mobile station, then the order of the plurality of scheduled mobile stations is rearranged, and the assignment and the movement processes are repeated.

In another aspect, scheduling grant channels to mobile stations further includes statically assigning at least one grant channel to each mobile station to monitor. In one embodiment, the static assignment involves assigning each of a first plurality of mobile stations to one of the grant channels in order until all available grant channels have been assigned, where the first plurality of mobile stations is a subset of a total number of mobile stations operating within an area of the CDMA communications network. The static assignment also involves assigning the remainder of the mobile stations to a first same number of grant channels, in order. In another embodiment, the static assignment involves randomly selecting a set of grant channels from the monitored grant channels to assign to each mobile station to monitor.

In another aspect, a CDMA communications network having a base station and a plurality of mobile stations includes a base station with a controller configured to schedule grant channels that carry grant messages to a plurality of scheduled mobile stations. The controller includes a grant channel assignment module that operates to assign, to a current mobile station of the plurality of scheduled mobile stations, a previously unassigned grant channel from a list of grant channels monitored by the current mobile station. The base station also includes a modulator configured to process and spread the grant messages. The base station further includes a transmitter unit configured to condition the processed grant messages, to generate a forward link signal, and to transmit the forward link signal on grant channels.

Other features and advantages of the present invention should be apparent from the following descriptions of the exemplary embodiments, which illustrate, by way of example, the principles of the invention.

BRIEF DESCRIPTION OF THE DRAWINGS

FIG. 2A, FIG. 2B, and FIG. 2C illustrate an exemplary "dynamic" process in which a grant channel is selected or assigned to carry a grant message to a scheduled mobile station.

DETAILED DESCRIPTION

Figure 1:
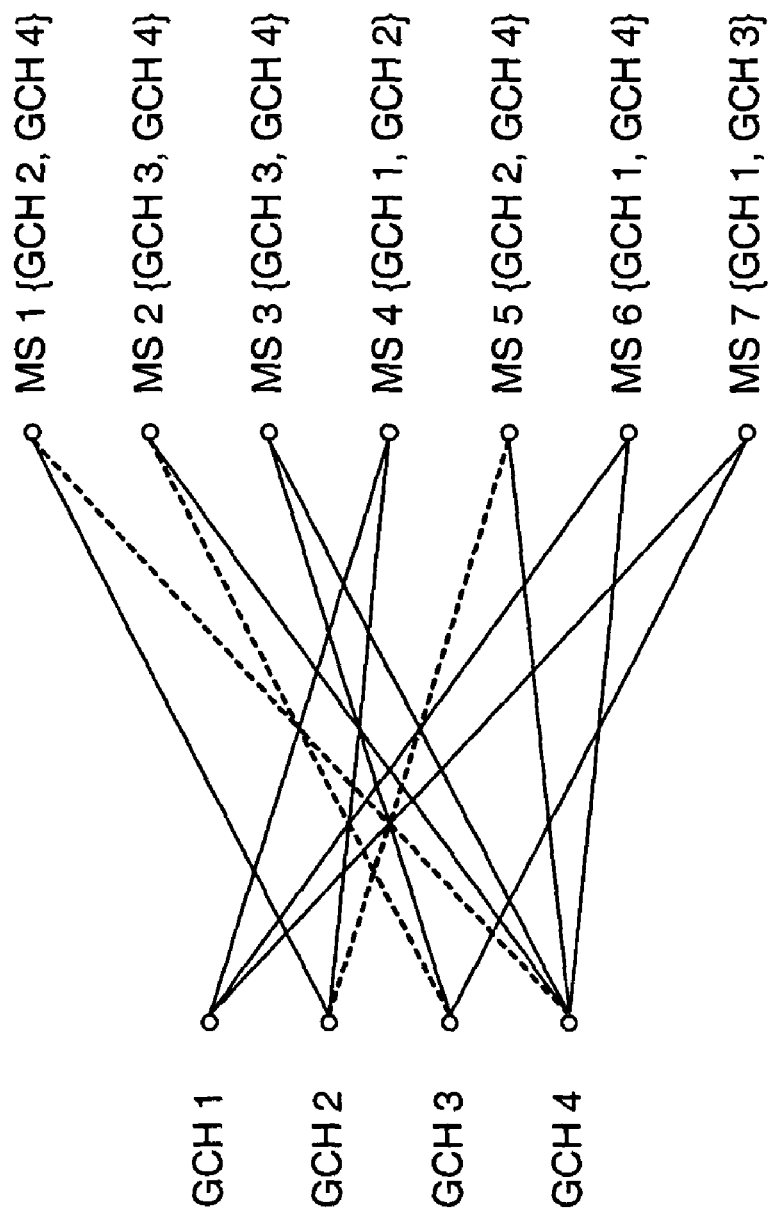
FIG. 1 illustrates an exemplary configuration of assigning grant channels to mobile stations.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in the drawing figures in block diagram form to avoid obscuring the concepts of the present invention. In the drawing figures, like reference numerals refer to like structures.

As described above, when only a subset of the grant channels is assigned to each mobile station to monitor, there may be times when not every scheduled mobile station can be notified about the grant. This expected performance loss (i.e., the "GCH outage") due to conflicts between the assigned subsets is undesirable. As described herein, it can be shown that the expected performance loss due to this "GCH outage" is not significant as long as each mobile station is able to monitor two or more grant channels. Moreover, by efficiently assigning grant channels to each mobile station to monitor, and by efficiently selecting a grant channel (from the assigned grant channels) to carry the notification to each scheduled mobile station, the expected performance loss can be further reduced.

In the following descriptions, the assignment of grant channels to each mobile station to monitor is referred to as a "static" assignment because this assignment is typically performed only once at initialization or at a similar initiation period of the mobile station. The selection of a grant channel from the statically assigned grant channels is referred to as a "dynamic" assignment because this selection can be repeated at every time slot, and can select a different grant channel.

FIG. 1 illustrates an exemplary configuration of assigning grant channels to mobile stations in a CDMA system. The exemplary configuration includes four individual grant channels GCH1, GCH2, GCH3, and GCH4; and seven mobile stations MS1, MS2, MS3, MS4, MS5, MS6, and MS7. Each mobile station monitors exactly two grant channels to receive the notification of the grant. The grant notifications for GCH1 through GCH4 all come from the base station. In the illustrated configuration, the first mobile station MS1 monitors grant channels GCH2 and GCH4; the mobile station MS2 monitors grant channels GCH3 and GCH4; the mobile station MS3 monitors grant channels GCH3 and GCH4; the mobile station MS4 monitors grant channels GCH1 and GCH2; the mobile station MS5 monitors grant channels GCH2 and GCH4; the mobile station MS6 monitors grant channels GCH1 and GCH4; and the mobile station MS7 monitors grant channels GCH1 and GCH3. In FIG. 1, the grant channels monitored by each mobile station are indicated by connecting lines leading from the mobile station to the monitored grant channels from the base station.

In the FIG. 1 exemplary configuration, the base station can schedule mobile stations MS1, MS2, and MS5 in a particular time slot by sending grants for mobile station MS1 on grant channel GCH4; for mobile station MS2 on grant channel GCH3; and for mobile station MS5 on grant channel GCH2. The connecting lines corresponding to this schedule mapping are shown as dotted lines in FIG. 1. Since the base station is able to allocate a grant channel for each of the three mobile stations, there is no GCH outage in this schedule mapping. However, if the base station were to schedule mobile station MS3 also in the same time slot, then a GCH outage would occur because there is no mapping for the exemplary configuration that could allocate a grant channel for each of the four scheduled mobile stations MS1, MS2, MS3, and MS5 in this case. That is, in the FIG. 1 configuration, only three grant channels GCH2, GCH3, and GCH4 are monitored among the four mobile stations MS1, MS2, MS3, and MS5. Thus, in this proposed schedule mapping, the GCH outage occurs because of less than efficient assignment of grant channels to mobile stations.

In recognition of the above-described desirability of efficiently assigning grant channels to each mobile station to monitor, and of selecting a grant channel to carry the notification to each scheduled mobile station, this disclosure describes exemplary embodiments of such assignments and/or selections. In particular, techniques for "dynamic" and "static" assignments are described in detail below. However, it should be understood that even an "efficient" assignment of the grant channels can sometimes result in a "GCH" outage because of system resource limitations.

FIG. 2A, FIG. 2B, and FIG. 2C illustrate an exemplary "dynamic" process in which a grant channel is selected or assigned to carry a grant message to a scheduled mobile station. In the exemplary "dynamic" selection process, it is assumed that a number of grant channels, which is less than the total number of individual grant channels, has been assigned to each mobile station to monitor in a "static" assignment process. Assumptions made about the static assignment process are further described in detail below.

Let k be the total number of individual grant channels. This number k is also the maximum number of mobile stations that can be scheduled simultaneously. Typically, k is between 2 and 8. Also, let/be the number of grant channels assigned to each mobile station to monitor.

In one embodiment, a set of r mobile stations is scheduled in each time slot (e.g. a period of 5 milliseconds), where r may differ from time slot to time slot. The size of the set of mobile stations, r, can be assumed to be uniformly distributed over $\{1, 2, \ldots, k\}$, i.e., $P(r)=1/k, r=1, \ldots, k$, or to be distributed according to the following probability distribution: $P(r=0), P(r=1), \ldots, P(r=8)=\{0.00860689, 0.0458367, 0.172538, 0.303443, 0.269816, 0.138511, 0.0490392, 0.0104083, 0.00180144\}$. The latter probability distribution is based on separate reverse link system level simulation results, which were obtained by assuming ten full buffer FTP users in the sector. Moreover, a randomly selected set of grant channels $\{GCH_1, GCH_2, \ldots, GCH_l\}$ is assigned to each mobile station to monitor.

In various embodiments and system configurations, the assignment of grant channels to be monitored by the mobile station can be either actively managed by the base station or can be hashed, in which grant channels are pseudo-randomly assigned based on a predetermined technique.

As discussed above, when each mobile station monitors fewer than the total number of individual grant channels (i.e., l<k), it is desirable for the base station to efficiently assign the grant channel in each time slot to a particular mobile station. This "dynamic" assignment task can be performed by searching for a solution in which the number of scheduled mobile stations that can be successfully assigned to a grant channel (designated as r') is maximal.

In various embodiments, the "dynamic" assignment can employ an exhaustive search by checking all $l^r$ possible assignments. The search could be terminated earlier whenever an assignment is found which gives r'=r. For example, with l=3 and k=r=8, the length of the worst-case exhaustive search would be $3^8=6561$.

Another way of carrying out an exhaustive search is to employ a recursive method. In this method, the search is performed in successive attempts. In each attempt, the first available grant channel from the list of l monitored grant channels is assigned to each mobile station. The assignment is performed sequentially for the r mobile stations according to a listing or ordering of the mobile stations. When a mobile station cannot be assigned a grant channel because all of its monitored grant channels have been previously assigned to other mobile stations by the technique, then the technique backtracks (i.e., sequentially retraces the ordering of the mobile stations in the opposite direction) until a mobile station with at least one monitored but yet unassigned grant channel is found. The assignment for that mobile station is switched to the next available monitored grant channel. The assignment process is then reattempted (i.e., the technique sequentially traces the ordering of the mobile stations in the original direction) for the remaining mobile station(s). This forward-backward search is continued until an assignment that gives r'=r is found, or until all possibilities are exhausted. This recursive method is typically completed in fewer than $l^r$ operations but that number might be considered too lengthy for many practical implementations.

In other embodiments, the "dynamic" assignment can employ a relatively short search (sometimes referred to as the "greedy" technique). In this short search, the first available grant channel from the list of l monitored grant channels is assigned to each mobile station. The assignment is done sequentially for the r mobile stations according to a listing or ordering of the mobile stations. Thus, this assignment will attempt to assign grant channels to mobile stations l×r times in such a way that the list of mobile stations and/or the list of monitored grant channels for each mobile station is rotated, or rearranged, between attempts. For the example where l=3 and k=r=8, there will only be 3×8=24 assignments to check in the worst-case scenario, which is a significantly smaller number than the worst-case exhaustive search equal to $3^8=6561$.

In the exemplary dynamic selection process illustrated in FIG. 2A, FIG. 2B, and FIG. 2C, there are eight grant channels (k=8), GCH1 through GCH8, and each mobile station monitors three grant channel (l=3). Furthermore, the base station schedules eight mobile stations (r=8) in a particular time slot. There are ten mobile stations, MS1 through MS 10, operating within the operating boundary of the base station.

FIG. 2A shows a "static" assignment of the grant channels to be monitored for each mobile station. For example, mobile station MS1 is assigned to monitor grant channels GCH1, GCH2, and GCH3, and mobile station MS2 is assigned to monitor grant channels GCH4, GCH5, and GCH6. The assignment of grant channels to monitor are also tabulated for the other mobile stations MS3 through MS10.

FIG. 2B shows a plurality of sequences of possible assignments for mobile stations that are scheduled in a particular time slot to be notified about the grant. For example, R0 is the first sequence, R1 is the second sequence, and so forth. Thus, in the first possible sequence or iteration for the exemplary time slot of FIG. 2B, mobile stations MS2, MS3, MS4, MS6, MS7, MS8, MS9, and MS10 are initially scheduled, as shown in the R0 row of FIG. 2B. It should be noted that the initial assignment ordering of MS2, MS3, . . . , MS10 is an arbitrary default ordering selected for purposes of this example. Other initial assignment orderings can be used, depending on system requirements or design preferences. In this example, the mobile stations MS1 and MS5 are not scheduled. The second possible assignment sequence for mobile stations and grant channels is shown in the R1 row of FIG. 2B as comprising the sequence MS3, MS4, MS6, MS7, MS8, MS9, MS10, and MS2. Again, MS1 and MS5 are not scheduled.

FIG. 2C illustrates the "dynamic" assignment process using the "greedy" technique described above. For example, using the assignment of grant channels to mobile stations tabulated in FIG. 2A and the list of mobile stations (R0) scheduled in the time slot as shown in FIG. 2B, the base station attempts to assign a mobile station to each grant channel, GCH1 to GCH8. The first assignment attempt using the list R0 of FIG. 2B is shown in the FIG. 2C column labeled R0.

According to the "greedy" technique, the first mobile station to be scheduled, MS2 (see FIG. 2B, row R0), is assigned to the first grant channel that MS2 is monitoring. Since FIG. 2A indicates that MS2 is monitoring grant channels GCH4, GCH5, and GCH6, mobile station MS2 is assigned to the first of these, grant channel GCH4. The second mobile station to be scheduled, MS3, monitors grant channels GCH1, GCH7, and GCH8. Thus, mobile station MS3 is assigned to grant channel GCH1, since GCH1 has not been previously assigned. The third mobile station to be scheduled, MS4, monitors grant channels GCH2, GCH3, and GCH4. Thus, mobile station MS4 is assigned to grant channel GCH2. By assigning the other mobile stations in similar processes, the assignment of mobile stations to grant channels can result as shown in the column of FIG. 2C labeled as R0. This represents the assignment of mobile stations to grant channels using the first sequence R0 of mobile stations. Therefore, the FIG. 2C result indicates that mobile station MS3 is assigned to grant channel GCH1, mobile station MS4 is assigned to grant channel GCH2, mobile station MS7 is assigned to grant channel GCH3, mobile station MS2 is assigned to grant channel GCH4, mobile station MS10 is assigned to grant channel GCH5, mobile station MS8 is assigned to grant channel GCH6, and mobile station MS6 is assigned to grant channel GCH8. However, the result also indicates that mobile station MS9 cannot be scheduled in this time slot, because all available grant channels have already been assigned, which results in a "GCH outage".

Referring again to FIG. 2B, the scheduled mobile stations in the R0 sequence is rotated by one to produce the next assignment sequence, R1. The R1 row of FIG. 2B shows the sequence of the scheduled mobile stations as MS3, MS4, MS6, MS7, MS8, MS9, MS10, and MS2. Applying the "greedy" technique to this sequence, the first mobile station to be scheduled in R1, MS3, is assigned to the first grant channel that MS3 is monitoring, GCH1 (see FIG. 2A). By assigning the other mobile stations in similar processes, the assignment of mobile stations to grant channels can result as shown in the R1 column of FIG. 2C. Therefore, the result indicates that mobile station MS3 is assigned to grant channel GCH1, mobile station MS4 is assigned to grant channel GCH2, mobile station MS7 is assigned to grant channel GCH3, mobile station MS10 is assigned to grant channel GCH4, mobile station MS2 is assigned to grant channel GCH5, mobile station MS8 is assigned to grant channel GCH6, and mobile station MS6 is assigned to grant channel GCH8. However, the result also indicates that once again the mobile station MS9 cannot be scheduled in this time slot, which again results in a "GCH outage".

The above-described sequence for rotation of the scheduled mobile stations can be repeated until the number of scheduled mobile stations that can be successfully assigned to a grant channel (r') is maximal, or until r' is equal to the total number of scheduled mobile stations (r'=r). When r'=r, there will be no "GCH outage".

The loss in reverse link efficiency due to GCH outage can be estimated as follows. Let r be the total number of mobile stations scheduled in a time slot. Assume that out of the r mobile stations, only r' can be notified by using the grant channels. Then, the remaining r-r' mobile stations are in GCH outages. The efficiency in the time slot can be computed as $$1 - \frac{r-r'}{r} = \frac{r'}{r}.$$

This efficiency value is conservative because the loss due to GCH outage can be mitigated by any or all of the following methods. For example, if there are mobile stations that cannot be notified due to GCH outage, then other mobile stations with outstanding requests could still be scheduled in the same time slot. The r-r' mobile stations that cannot be notified due to GCH outage can be selected from the lower priority users (among the scheduled users). The r-r' mobile stations that cannot be notified due to GCH outage could be still scheduled on a common grant channel.

Referring again to FIG. 2B, next consider the sequence of scheduled mobile stations that is rotated to produce the sequence shown in row R4. The row R4 of FIG. 2B shows the sequence of the scheduled mobile stations as MS7, MS8, MS9, MS10, MS2, MS3, MS4, and MS6. Applying the "greedy" technique to this sequence, the first mobile station to be scheduled in this sequence, MS7, is assigned to the first grant channel that MS7 is monitoring, GCH3. By assigning the other mobile stations in similar processes, the assignment of mobile stations to grant channels can result as shown in the column of FIG. 2C labeled as R4. Therefore, the result indicates that mobile station MS9 is assigned to grant channel GCH1, mobile station MS4 is assigned to grant channel GCH2, mobile station MS7 is assigned to grant channel GCH3, mobile station MS10 is assigned to grant channel GCH4, mobile station MS2 is assigned to grant channel GCH5, mobile station MS8 is assigned to grant channel GCH6, mobile station MS3 is assigned to grant channel GCH7, and mobile station MS6 is assigned to grant channel GCH8. Accordingly, each of the eight scheduled mobile stations have been assigned to a grant channel, resulting in no "GCH outage", as indicated in FIG. 2C.

Figure 3:
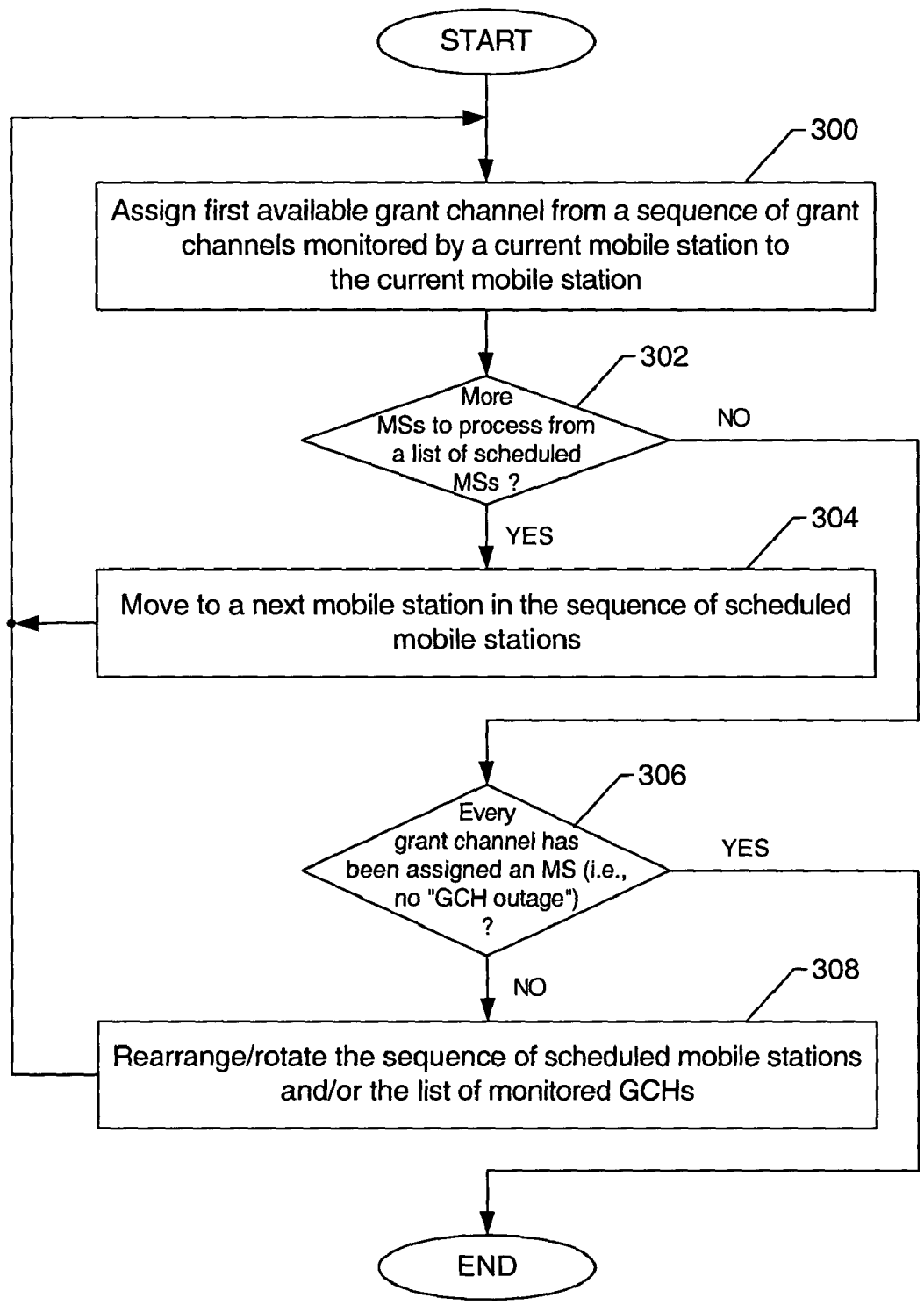
FIG. 3 summarizes a "greedy" technique applied in the exemplary dynamic selection process described in FIG. 2A, FIG. 2B, and FIG. 2C.

The "greedy" technique applied in the exemplary dynamic selection process, described in FIG. 2A, FIG. 2B, and FIG. 2C, is summarized in FIG. 3. The technique involves sequencing through a plurality of sequences of scheduled mobile stations for a time slot. In one embodiment, a first available (unassigned) grant channel from a list of grant channels monitored by a current mobile station is assigned to the current mobile station (see box 300). In another embodiment, any unassigned grant channel from the list of grant channels is assigned to the current mobile station.

If it is determined that there are more mobile stations to process in the sequence of scheduled mobile stations (a "YES" outcome at box 302), then the processing moves to a next mobile station in the sequence of scheduled mobile stations, at box 304, and repeats the process shown in box 300. Once the grant channel is assigned, that grant channel is removed from the list of all available grant channels. Otherwise, if it is determined that there are no more mobile stations to process in the sequence of scheduled mobile stations (a "NO" outcome at box 302), then a determination is made as to whether every grant channel has been assigned a mobile station, at box 306. A "YES" outcome of this determination will indicate that there is no GCH outage in scheduling the grant channels, while a "NO" outcome will indicate that there is a GCH outage and that a new assignment should be attempted. Thus, if a GCH outage is detected, at box 306, the sequence of scheduled mobile stations and/or the list of monitored grant channels for each mobile station is rearranged, at box 308. In one embodiment, the sequence of scheduled mobile stations and/or monitored grant channels is rearranged in such a way that the sequence of mobile stations is rotated as shown in FIG. 2B. For example, in FIG. 2B, sequence R1 is a rotated version of sequence R0. In another embodiment, the sequence of the list of scheduled mobile stations and/or monitored grant channels is rearranged in any manner such that the new sequence is different from the previous sequences.

If the GCH outage is detected, at box 306, the procedures described in boxes 300 and 304 are repeated, after rearrangement of the sequence of the list of scheduled mobile stations and/or monitored grant channels. If the GCH outage persists until the rearrangement of the sequence has been exhausted and there are no more previously unassigned sequence, then the mobile station cannot be notified about the grant at this time slot. In this case, the base station can wait until the next time slot to again attempt to schedule the mobile station affected by the GCH outage.

Figure 4:
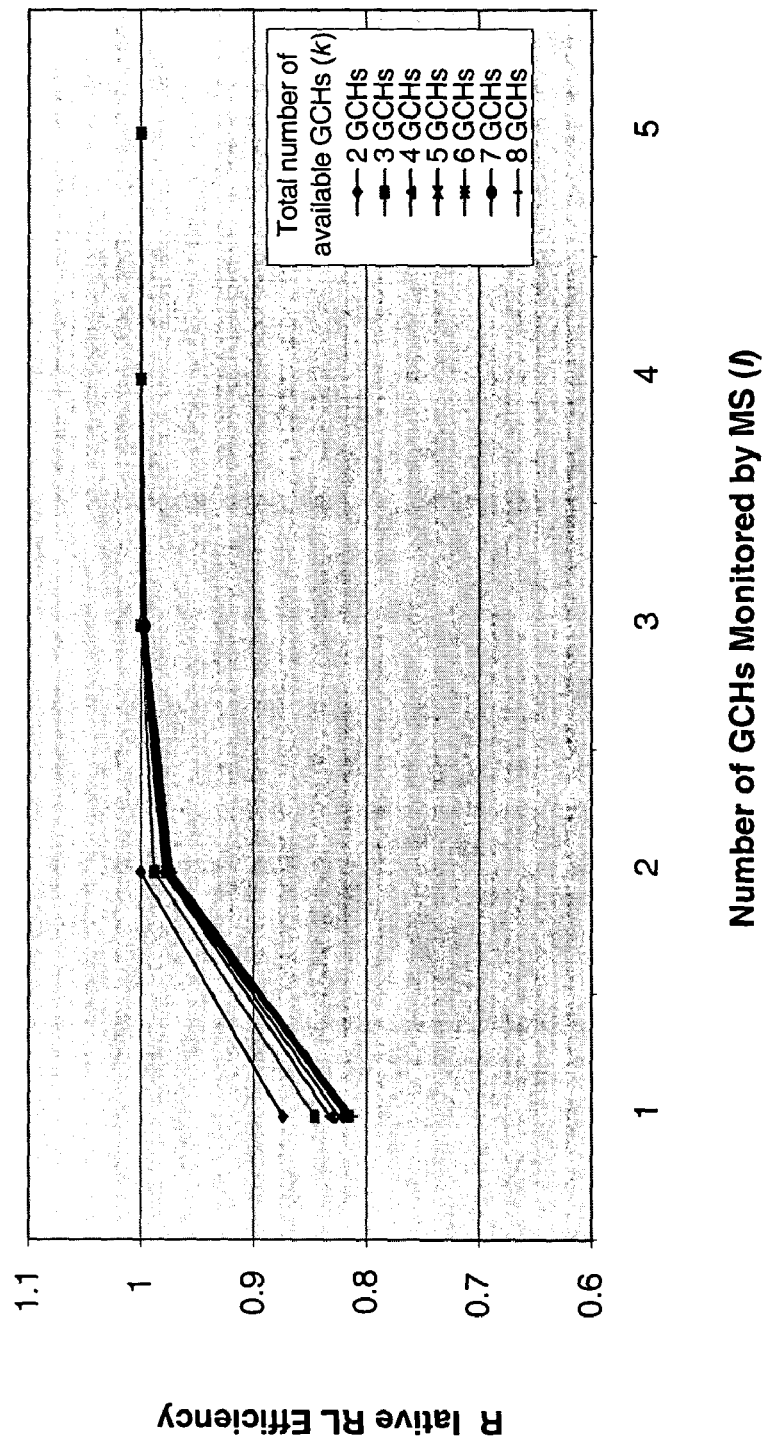
FIG. 4 illustrates simulation results of exemplary grant channel assignment performance expressed in terms of a relative reverse link efficiency where the number of mobile stations scheduled per time slot is uniformly distributed over $\{1, 2, \ldots, k\}$.
Figure 5:
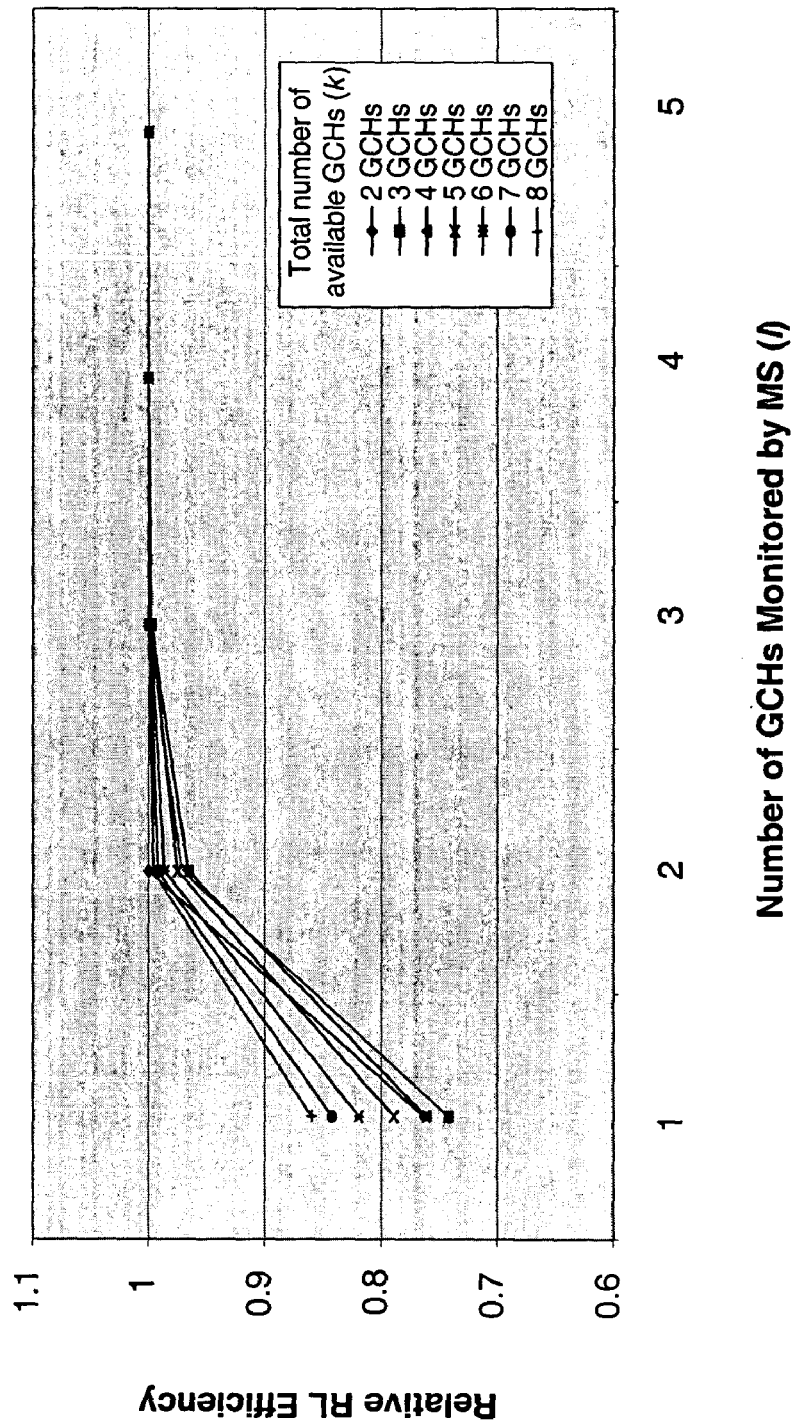
FIG. 5 illustrates simulation results of exemplary grant channel assignment performance expressed in terms of a relative reverse link efficiency where the number of mobile stations scheduled per time slot is distributed according to the following probability distribution: $P(0), P(1), \ldots, P(8) = \{0.00860689, 0.0458367, 0.172538, 0.303443, 0.269816, 0.138511, 0.0490392, 0.0104083, 0.00180144\}$.

FIG. 4 and FIG. 5 illustrate simulation results of exemplary grant channel assignment performance expressed in terms of a relative reverse link efficiency for a different number of grant channels (l) monitored by each mobile station. Relative reverse link efficiency of 1.0 would be obtained if GCH outage never occurred. Each figure includes seven curves representing different total number of available grant channels (k). FIG. 4 illustrates the reverse link efficiency assuming the number of mobile stations scheduled per time slot to be uniformly distributed over $\{1, 2, \ldots, k\}$, i.e., $P(r)=1/k, r=1, \ldots, k$. FIG. 5 illustrates the reverse link efficiency assuming the number of mobile stations scheduled per time slot to be distributed according to the following probability distribution: $P(r=0), P(r=1), \ldots, P(r=8)=\{0.00860689, 0.0458367, 0.172538, 0.303443, 0.269816, 0.138511, 0.0490392, 0.0104083, 0.00180144\}$.

Since the relative efficiency values shown in FIG. 4 and FIG. 5 are normalized for each curve, efficiency value comparisons should not be made between curves. That is, the curves do not provide insight into the performance difference between cases corresponding to different values of k. However, the curves do give insight into the performance difference between cases corresponding to different l values for any given k. It should be understood that conservative assumptions were used in computing the reverse link efficiency loss illustrated in FIG. 4 and FIG. 5. Thus, results shown herein should be construed as lower bounds on performance.

The simulation results shown in FIG. 4 and FIG. 5 indicate that with each mobile station monitoring two grant channels (i.e., l=2), there is only an approximately 3% to 5% loss in efficiency (i.e., the relative efficiency is approximately 95% to 97%). When each mobile station monitors at least three grant channels (i.e., l≧3), the efficiency loss is shown to be insignificant. Thus, the results show that by having each mobile station monitor two or three individual grant channels, the reverse link performance can be expected to approach the performance achieved by having each mobile station to monitor all grant channels. It should be noted that for randomly chosen assignment, the more appropriate performance measure, in some instances, is the probability that the assignment gives the number of GCH outages which is less or equal to a given level is greater than a certain critical value.

Based on the above results of the grant channel assignments, the following assumptions would ensure adequate performance of the cdma2000 reverse link. It is assumed that the mobile station has the capability to monitor at least two individual grant channels simultaneously. It is also assumed that the base station has a capability to signal GCH assignment parameters to the mobile station in Layer 3 (L3) messages, such as enhanced channel assignment messages (ECAM) and universal handoff direction messages (UHDM). The cdma2000 reverse link is described in the document entitled "cdma2000 Reverse Link Proposal Rev. D", document no. C30-20030217-011, which was proposed to a standards setting committee of 3GPP2 on Feb. 17, 2003.

The simulation results illustrating expected performance loss due to GCH outage were discussed above. However, these results were obtained by simulation under the assumption that each mobile station has a randomly selected set of grant channels assigned to it (i.e., random "static" assignment). Various embodiments are described below, which use a nonrandom set of grant channels. It can be shown that using explicitly assigned set of grant channels for each mobile station provides a better performance than using the random set. Moreover, for the uniform probability distribution of the size of set of mobile stations scheduled in each time slot (i.e., uniformly distributed over $\{1, 2, \ldots, k\}$), it can be shown that the reverse link efficiency of using the nonrandom set of grant channels is substantially optimal. That is, the below-described technique for non-randomly assigning sets of grant channels to mobile stations provides maximum reverse link efficiency.

Let the total number of mobile stations (n) be ten (i.e., n=10), the number of grant channels (l) assigned to each mobile station to monitor be one (i.e., l=1), and the number of grant channels (k) that can be scheduled simultaneously be eight (i.e., k=8). The mobile stations are designated from MS1 to MS10, while the grant channels are designated from GCH1 to GCH8. Furthermore, assume that the size of set of mobile stations scheduled in each time slot is uniformly distributed. Then, for substantially optimum assignment that gives the maximum efficiency, the efficiency is not less than $$c(n,k) = 1 - \sum_{r=0}^{k} P(r) \frac{\binom{n-2}{r-2} + \binom{n-3}{r-2} + \binom{n-4}{r-3} + \binom{n-4}{r-4}}{r \cdot \binom{n}{r}}, \quad (1)$$

where $$\frac{\binom{n-2}{r-2} + \binom{n-3}{r-2} + \binom{n-4}{r-3} + \binom{n-4}{r-4}}{r \cdot \binom{n}{r}} \triangleq \begin{cases} 0 & \text{if } r = 0 \\ 1 & \text{if } r = 1, \end{cases} \quad (2)$$

$$\binom{y}{x} = 0, \text{ if } x < 0, \quad \binom{y}{x} = 1, \text{ if } x = 0, \text{ and}$$

P(r) is the probability distribution of the set size for the set of mobile stations that is scheduled in a time slot.

In one exemplary embodiment of a non-random "static" assignment, a number of assumptions is made as described above, including the assumption that the size of set of mobile stations scheduled in each time slot is uniformly distributed as $P(r)=1/k, r=1, \ldots, k$. In this exemplary embodiment, the maximum reverse link efficiency can be achieved by assigning grant channels GCH1, GCH2, GCH3, GCH4, GCH5, GCH6, GCH7, GCH8, GCH1, and GCH2 to scheduled mobile stations MS1, MS2, MS3, MS4, MS5, MS6, MS7, MS8, MS9, and MS10, respectively.

To verify and prove that the maximum reverse link efficiency can be achieved by assigning the grant channels to the scheduled mobile stations, as defined above, consider the following. For n=10 mobile stations, k=8 scheduled grant channels, and l=1 grant channels assigned to each mobile station to monitor, the number 1 grant channel (referred to as a-number 1) is assigned to mobile stations MS1 and MS9, and a-number 2 is assigned to mobile stations MS2 and MS10. Moreover, grant channel a-number i, where i=3, 4, 5, 6, 7, 8, is assigned to the mobile station MS i.

A combination of r different mobile stations, by definition, results in the GCH outage if it contains mobile stations with the same a-numbers. From a combinatorial point of view, the unordered combinations are considered here. Also, the outage of a combination has the multiplicity m, where m≦k−1, if the number of different a-numbers in the combination is k−m. The combination of r mobile stations is the set of mobile stations scheduled in a time slot.

The number of combinations that results in the GCH outages, U, is calculated below. The outage occurs in three cases, where $$\binom{y}{x} = 0,$$

if x<0 and $$\binom{y}{x} = 1, \text{ if } x = 0.$$

In the first case, mobile stations MS1 and MS9 are in combination and mobile station MS10 is not. The number of such different combinations is $$\binom{n-3}{r-2}.$$

In this case, the 2 in r−2 is the number of mobile stations (i.e., MS1 and MS9) that must participate in all such combinations. The other r−2 mobile stations in such combinations are taken from the n−3 mobile stations MS2, MS3, MS4, MS5, MS6, MS7, and MS8.

In the second case, mobile stations MS2 and MS10 are in combination without any additional restriction. The number of such different combinations is $$\binom{n-2}{r-2}.$$

In this case, the 2 in r−2 refers to mobile stations MS2 and MS10 that must participate in all such combinations. The other r−2 mobile stations in such combinations are taken from the n−2 mobile stations MS1, MS3, MS4, MS5, MS6, MS7, MS8, and MS9.

In the third case, mobile stations MS1, MS9, and MS10 are in combination and mobile station MS2 is not. The number of such different combinations is $$\binom{n-4}{r-3}.$$

In this case, the 3 in r−3 refers to mobile stations MS1, MS9, and MS10 that must participate in all such combinations. The other r−3 mobile stations in such combinations are taken from the n−4 mobile stations MS3, MS4, MS5, MS6, MS7, and MS8.

The combinations in the three cases considered above are different. Thus, $$U = \binom{n-2}{r-2} + \binom{n-3}{r-2} + \binom{n-4}{r-3}. \tag{3}$$

The number of combinations with the outages of multiplicity two, $U_2$, is then calculated as follows:

$$U_2 = \binom{n-4}{r-4}. \tag{4}$$

Thus, the formulation of Equation (4) indicates that each combination with the outage of multiplicity two should contain the mobile stations MS1, MS2, MS9, and MS10 and the other r−4 mobile stations in such combinations are taken from the n−4 mobile stations MS3, MS4, MS5, MS6, MS7, and MS8.

For the assignment considered above, the combinations with the outage of multiplicity greater than two do not exist. Hence, Equations (3) and (4) for expressions U and $U_2$ provide the following general expression for $U_1$, number of combinations that give the outages of multiplicity one:

$$U_1 = \binom{n-2}{r-2} + \binom{n-3}{r-2} + \binom{n-4}{r-3} - \binom{n-4}{r-4}. \tag{5}$$

The total number of combination of n mobile stations taken r at a time is given as $$\binom{n}{r}.$$

If a combination is without an outage, then all r mobile stations in the combination can be notified by using the grant channels. If a combination is with an outage of multiplicity one, then one mobile station in the combination cannot use the grant channels. If a combination is with an outage of multiplicity two, then two mobile stations in the combination cannot use the grant channels.

If all $$\binom{n}{r}$$

combinations have the same probability of appearing, then the average number of mobile stations that are notified is $$b(r) = \frac{U_0}{\binom{n}{r}} r + \frac{U_1}{\binom{n}{r}} (r-1) + \frac{U_2}{\binom{n}{r}} (r-2) = r - \frac{U_1}{\binom{n}{r}} - \frac{2U_2}{\binom{n}{r}}, \tag{6}$$

where $$U_0 = \binom{n}{r} - U_1 - U_2$$

is the number of combinations without outages and b(0)=0. Let r be a random variable having the distribution P(r).

The normalized-with-respect-to-r average number of mobile stations that are notified is $$a(r) = \frac{b(r)}{r}, \quad a(0) = 0, \quad a(1) = 1. \tag{7}$$

The efficiency c(n, k) is defined by $$c(n, k) \triangleq \sum_{r=0}^{k} P(r)a(r). \tag{8}$$

Using Equation (4) through Equation (7), Equation (1) is obtained for the assignment of grant channels GCH1, GCH2, GCH3, GCH4, GCH5, GCH6, GCH7, GCH8, GCH1, GCH2 to mobile stations MS1, MS2, MS3, MS4, MS5, MS6, MS7, MS8, MS9, and MS10, respectively.

For the uniform distribution P(r)=1/k, r=1, . . . , k, the assignment of the above-listed grant channels to the mobile stations is shown to be substantially optimal because c(n, k) is the same for any assignment such that of the ten a-numbers, eight have different a-numbers and two have additional different a-numbers taken from those eight a-numbers. For any assignment with less than eight different a-numbers or with the different eight a-numbers, but with identical two additional a-numbers, c(n, k) is less than c(n, k) computed from Equation (8).

In one example, consider the case where n=10, k=8, and P(r)=1/k, r=1, . . . , k. Then, according to Equation (8), c(n, k)=0.922 when grant channels GCH1, GCH2, GCH3, GCH4, GCH5, GCH6, GCH7, GCH8, GCH1, GCH2 are optimally assigned to mobile stations MS1, MS2, MS3, MS4, MS5, MS6, MS7, MS8, MS9, and MS10, respectively. However, for the same case but with a randomly selected assignment, the efficiency is shown to be about 0.82 (see FIG. 4).

In another example, consider the case where n=10, k=8, and the probability distribution is as follows: P(0)=0.00860689, P(1)=0.0458367, P(2)=0.172538, P(3)=0.303443, P(4)=0.269816, P(5)=0.138511, P(6)=0.0490392, P(7)=0.0104083, P(8)=0.00180144. Then, according to Equation (8), c(n, k)=0.937 when grant channels GCH1, GCH2, GCH3, GCH4, GCH5, GCH6, GCH7, GCH8, GCH1, GCH2 are optimally assigned to mobile stations MS1, MS2, MS3, MS4, MS5, MS6, MS7, MS8, MS9, and MS10, respectively. However, for the same case but with a randomly selected assignment, the efficiency is shown to be about 0.86 (see FIG. 5).

Accordingly, it can be seen that the non-random assignment of grant channels to mobile stations provides higher reverse link efficiency than the random assignment.

In another exemplary embodiment of a non-random "static" assignment, a number of assumptions is made as described below. Let the total number of mobile stations (n) be an even number, the number of grant channels (l) assigned to each mobile station to monitor be one (i.e., l=1), and the number of grant channels (k) that can be scheduled simultaneously be k=n/2. The mobile stations are designated from MS1 to MSn, while the grant channels are designated from GCH1 to GCHk. Furthermore, assume that the size of set of mobile stations scheduled in each time slot is uniformly distributed. Then, for substantially optimum assignment that gives the maximum efficiency, the efficiency is not less than $$c(n, k) = 1 - \sum_{r=1}^{k} P(r) \frac{\sum_{i=1}^{\lfloor k/2 \rfloor} i \cdot \binom{n/2}{i}\binom{(n/2)-i}{r-2i} \cdot 2^{r-2i}}{r \cdot \binom{n}{r}}, \tag{9}$$

where $$\binom{y}{x} = 0, \text{ if } x < 0, \quad \binom{y}{x} = 1, \text{ if } x = 0,$$

P(r) is the probability distribution of the set size for the set of mobile stations that is scheduled in a time slot.

In this exemplary embodiment, the maximum reverse link efficiency can be achieved by assigning grant channels GCH1, GCH2, . . . , GCH(n/2), GCH1, GCH2, . . . , and GCH(n/2) to scheduled mobile stations MS1, MS2, . . . , and MSn, respectively.

To verify and prove that the maximum reverse link efficiency can be achieved by assigning the grant channels to the scheduled mobile stations, as defined above, consider the following. For a given total even number of mobile stations n and a given number of grant channels that can be scheduled simultaneously k=n/2, let U(n, k, r, m) denote the number of combinations having r different mobile stations and GCH outage of multiplicity m. Let S(n, k, r, m) denote the set of these U(n, k, r, m) combinations. In this proof, the definitions of the combination, a-number, outage, and outage of multiplicity m are kept same as the definitions in the first embodiment described above.

For $0 \leq r < 2m$, $$U(n, k, r, m) = 0. \tag{10}$$

For $2m \leq r \leq k$, $$U(n, k, r, m) = \binom{n/2}{m}\binom{(n/2)-m}{r-2m} \cdot 2^{r-2m}. \tag{11}$$

Equation (11) can be validated as follows. Each combination from S(n, k, r, m) has exactly m pair of mobile stations such that the mobile stations from each pair have the identical a-numbers. The number of such different m pairs is equal to $$\binom{n/2}{m}.$$

The m pairs are sometimes referred to as twins pairs. For each combination from S(n, k, r, m), there is a set of the rest pairs (i.e., the pairs that are not among the m twins pairs). The number of the rest pairs is equal to (n/2)–m.

A pair from the rest pairs can give no more than one of its mobile stations to the combination. The combination can get exactly r–2m such mobile stations from the rest pairs, which means that for the given twins pairs and given r–2m pairs from the rest pairs, the rest pairs can provide $2^{r-2m}$ different mobile station combinations. For the given twins pairs, the total number of different sets of the r–2m rest pairs is $$\binom{(n/2)-m}{r-2m},$$

which is given in Equation (11).

The total number of combination of n mobile stations taken r at a time is $$\binom{n}{r}.$$

Thus, if all $$\binom{n}{r}$$

combinations have the same probability of appearing, then the average number of mobile stations that are notified is $$b(n,k,r) = \sum_{m=0}^{\lfloor k/2 \rfloor} \frac{U(n,k,r,m)}{\binom{n}{r}}(r-m) = r - \frac{1}{\binom{n}{r}} \sum_{m=1}^{\lfloor k/2 \rfloor} mU(n,k,r,m). \quad (12)$$

Equation (9) can be obtained after normalization of b(n, k, r) with respect to r and averaging over r.

In one example, consider the case where n=10, k=5, and P(r)=1/k, r=1, . . . , k. Then, according to Equation (9), c(n, k)=0.889 when grant channels GCH1, GCH2, . . . , GCH (n/2), GCH1, GCH2, . . . , and GCH(n/2) are optimally assigned to scheduled mobile stations MS1, MS2, . . . , and MSn, respectively. However, for the same case but with a randomly selected assignment, the efficiency is shown to be about 0.83 (see FIG. 4).

In another example with uniform probability distribution (i.e., P(r)=1/k, r=1, . . . , k), consider the cases where [n=16, k=8], [n=14, k=7], and [n=12, k=6]. Again, according to Equation (9), c(n, k)=0.883, c(n, k)=0.885, and c(n, k)=0.886, respectively, when grant channels GCH1, GCH2, . . . , GCH(n/2), GCH1, GCH2, . . . , and GCH(n/2) are optimally assigned to scheduled mobile stations MS1, MS2, . . . , and MSn, respectively. The efficiency number is not given for the same case but with a randomly selected assignment. However, the efficiency number is expected to be lower than those given for the non-random case shown here.

Figure 6:
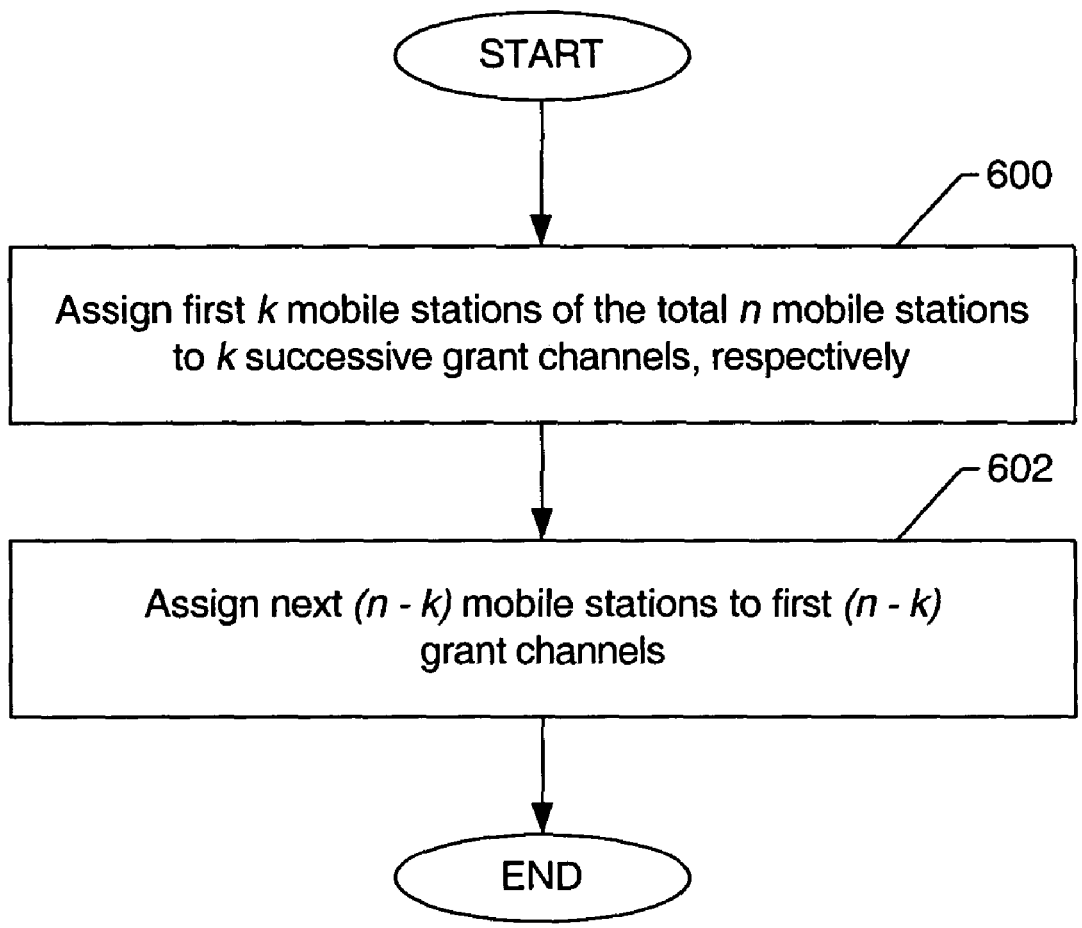
FIG. 6 is a flow chart illustrating a non-random static assignment of set of grant channels to mobile station to monitor.

FIG. 6 is a flow chart that illustrates the above-described non-random "static" assignment of sets of grant channels to mobile stations to monitor. The assignment process summarized in FIG. 6 assumes that n represents the total number of mobile stations and that k represents the total number of grant channels that can be scheduled simultaneously. Thus, k must be at least as large as r, which is equal to the number of mobile stations that is scheduled in a time slot.

The non-random "static" assignment process successively assigns the first k mobile stations of the total n mobile stations to the k grant channels, respectively, at box 600. The next (n–k) mobile stations are assigned to the first (n–k) grant channels, at box 602. Thus, the first (n–k) grant channels will have at least two mobile stations assigned to them.

Figure 7:
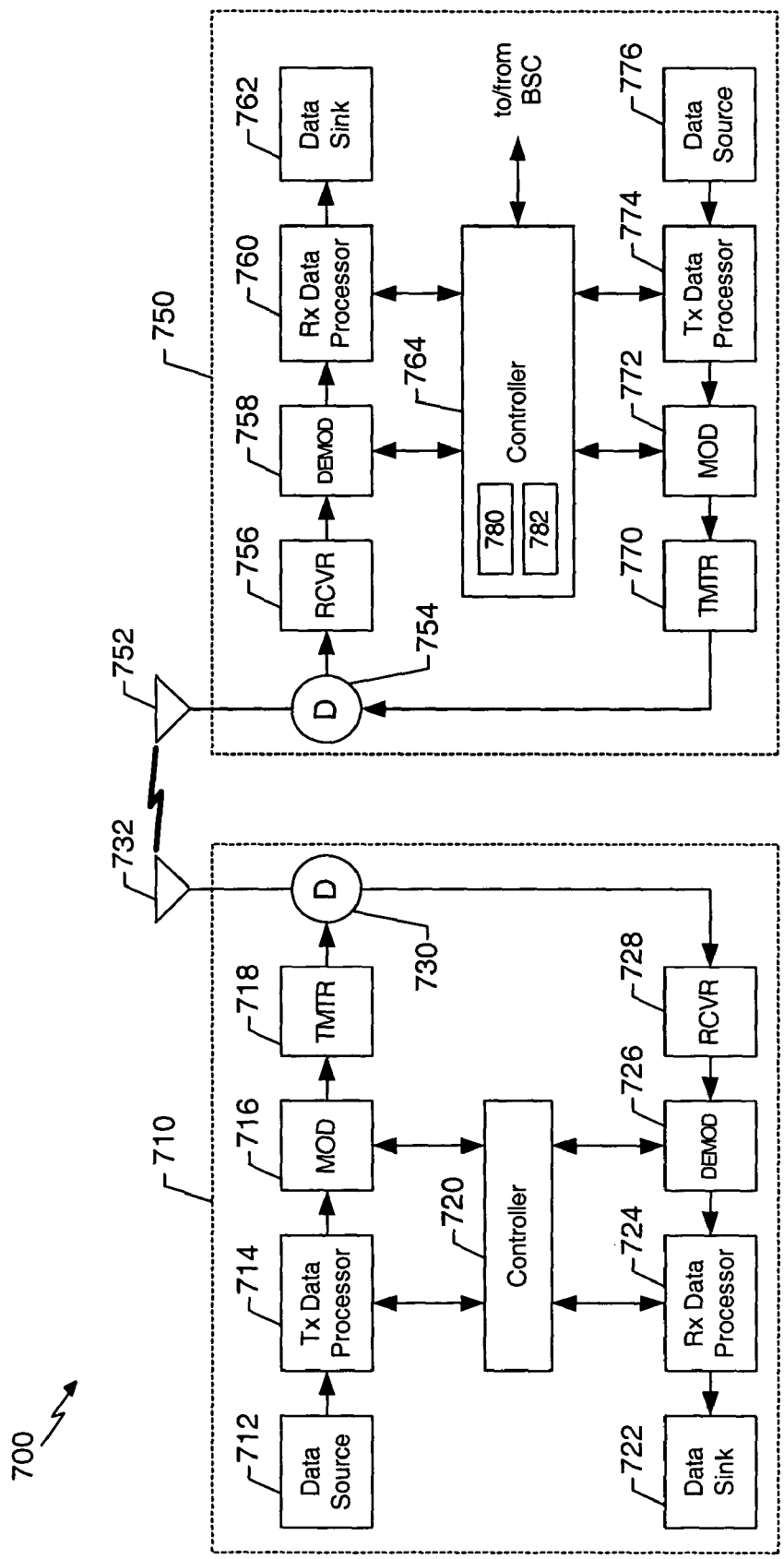
FIG. 7 is a simplified block diagram of a CDMA communication system, such as the HDR access network.

FIG. 7 is a simplified block diagram of a CDMA communication system 700, such as the 1 xEV-DV access network. The system 700 includes at least a base station 750 and a mobile station 710 that are capable of implementing various aspects of the invention. For a particular communication, voice data, packet data, and/or messages may be exchanged between the base station 750 and the mobile station 710. Various types of messages may be transmitted such as messages used to establish a communication session between the base station and the mobile station and messages used to control a data transmission (e.g., power control, data rate information, acknowledgment, and so on).

For the forward link, at the base station 750, voice and/or packet data (e.g., from a data source 776) and messages (e.g., from the controller 764) are processed (e.g., formatted and encoded) by a transmit (TX) data processor 774, further processed (e.g., covered and spread) by a modulator (MOD) 772, and conditioned (e.g., converted to analog signals, amplified, filtered, and quadrature modulated) by a transmitter unit (TMTR) 770 to generate a forward link signal.

The messages processed by the base station controller 764 may include grant messages carrying grants specific to mobile stations, such as R-ESCH grants. These messages may use individual Grant Channels optimally assigned according to the techniques described above. The controller 764 schedules the mobile stations in a particular time slot by processing and assigning a grant channel to each scheduled mobile station. The controller includes memory in which one maintained lists and orderings of the mobile stations, grant channels, and time slot configurations, such as assignments and scheduling, as illustrated in FIGS. 2A, 2B, 2C. In one embodiment, the controller 764 includes a grant channel assignment module 780 that assigns to a current mobile station of the plurality of scheduled mobile stations, a previously unassigned grant channel from a list of grant channels monitored by the current mobile station. The controller 764 may also include a rearrangement module 782 configured to rearrange the order of the plurality of scheduled mobile stations and repeat the assignment process executed by the grant channel assignment module, if not every grant channel has been assigned a mobile station. The forward link signal is then routed through the duplexer 754 and transmitted via the antenna 752 to the mobile station 710.

At the mobile station 710, the forward link signal is received by the antenna 732, routed through the duplexer 730, and provided to a receiver unit 728. The receiver unit 728 conditions (e.g., downconverts, filters, amplifies, quadrature demodulates, and digitizes) the received signal and provides samples. The samples are processed (e.g., despreaded, decovered, and pilot demodulated) by a demodulator 726 to provide symbols, and the symbols are further processed (e.g., decoded and checked) by a receive data processor 724 to recover the data and messages transmitted on the forward link. The recovered data is provided to a data sink 722, and the recovered messages may be provided to the controller 720.

On the reverse link, at the mobile station 710, voice and/or packet data (e.g., from a data source 712) and messages (e.g., from a controller 720) are provided to a transmit (TX) data processor 714, which formats and encodes the data and messages with one or more coding schemes to generate coded data. Each coding scheme may include any combination of cyclic redundancy check (CRC), convolutional, Turbo, block, and other coding, or no coding at all. Typically, voice data, packet data, and messages are coded using different schemes, and different types of message may also be coded differently.

The coded data is then provided to a modulator (MOD) 716 and further processed (e.g., covered, spread with short PN sequences, and scrambled with a long PN sequence assigned to the user terminal). The modulated data is then provided to a transmitter unit (TMTR) 718 and conditioned (e.g., converted to one or more analog signals, amplified, filtered, and quadrature modulated) to generate a reverse link signal. The reverse link signal is routed through a duplexer (D) 730 and transmitted via an antenna 732 to the base station 750.

At the base station 750, the reverse link signal is received by an antenna 752, routed through a duplexer 754, and provided to a receiver unit (RCVR) 756. The receiver unit 756 conditions (e.g., filters, amplifies, downconverts, and digitizes) the received signal and provides samples. A demodulator (DEMOD) 758 receives and processes (e.g., despreads, decovers, and pilot demodulates) the samples to provide recovered symbols. The demodulator 758 may implement a rake receiver that processes multiple instances of the received signal and generates combined symbols. A receive (RX) data processor 760 then decodes the symbols to recover the data and messages transmitted on the reverse link. The recovered voice/packet data is provided to a data sink 762 and the recovered messages may be provided to a controller 764. The processing by the demodulator 758 and the RX data processor 760 are complementary to that performed at the mobile station 710.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and techniques described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The procedures of a method or technique described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A base station in a CDMA communications network, the base station comprising:
   a controller configured to schedule grant channels to carry grant messages to a plurality of scheduled mobile stations in an area of the CDMA communications network, the controller including a grant channel assignment module that operates to:
      assign to a current mobile station in an ordering of the plurality of scheduled mobile stations, a previously unassigned grant channel from a list of grant channels monitored by the current mobile station; and
      repeat the assignment for a next mobile station in the ordering of scheduled mobile stations, if there are more mobile stations to be processed in the ordering of the scheduled mobile stations;
   a modulator configured to process and spread the grant messages; and
   a transmitter unit configured to condition the processed grant messages, to generate a forward link signal, and to transmit the forward link signal on grant channels.

2. The base station of claim 1, wherein each message in the grant messages include messages specific to a mobile station.

3. The base station of claim 1, wherein the grant messages include Reverse Enhanced Supplemental Channel (R-ESCH) grants.

4. The base station of claim 1, wherein the controller includes:

a rearrangement module configured to rearrange the order for the plurality of scheduled mobile stations, and to repeat the assignment process executed by the grant channel assignment module, if not every grant channel has been assigned a mobile station, if not every grant channel has been assigned a mobile station.

5. The base station of claim 4, wherein the rearrangement module rearranges the order of the list of grain channels monitored by the current mobile station.

6. The base station of claim 5, wherein the rearrangement module rearranges the list order by rotating the order of the plurality of scheduled mobile stations.

7. The base station of claim 1, wherein the previously unassigned grant channel includes a first available grant channel from the list of grant channels monitored by the current mobile station.

8. The base station of claim 1, wherein the plurality of scheduled mobile stations is a subset of a total number of mobile stations operating within the area.

9. A CDMA communications network, comprising:
　a first plurality of mobile stations operating within the CDMA communications network; and
　a base station, comprising:
　　a controller configured to schedule grant channels to carry grant messages to a plurality of scheduled mobile stations in an area of the CDMA communications network, the controller including a grant channel assignment module that operates to assign to a current mobile station in an ordering of the plurality of scheduled mobile stations, a previously unassigned grant channel from a list of grant channels monitored by the current mobile station; and repeat the assignment for a next mobile station in the ordering of scheduled mobile stations, if there are more mobile stations to be processed in the ordering of the scheduled mobile stations;
　　a modulator configured to process and spread the grant messages; and
　　a transmitter unit configured to condition the processed grant messages, to generate a forward link signal, and to transmit the forward link signal on grant channels.

10. The communications network of claim 9, wherein the controller in the base station further includes:
　a rearrangement module configured to rearrange the order for the plurality of scheduled mobile stations, and to repeat the assignment process executed by the grant channel assignment module, if not every grant channel has been assigned a mobile station, if not every grant channel has been assigned a mobile station.

11. The communications network of claim 10, wherein the rearrangement module rearranges the order of the list of grant channels monitored by the current mobile station.

12. The communications network of claim 11, wherein the rearrangement module rearranges the list order by rotating the order of the plurality of scheduled mobile stations.

13. The communications network of claim 9, wherein the previously unassigned grant channel includes a first available grant channel from the list of grant channels monitored by the current mobile station.

14. The communications network of claim 9, wherein the plurality of scheduled mobile stations is a subset of a total number of mobile stations operating within the area.

\* \* \* \* \*